(12) United States Patent
Seo

(10) Patent No.: US 10,041,380 B2
(45) Date of Patent: Aug. 7, 2018

(54) ENGINE PREHEATING APPARATUS AND PREHEATING METHOD OF THE ENGINE

(71) Applicant: HYUNDAI MOTOR COMPANY, Seoul (KR)

(72) Inventor: Jung Min Seo, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 114 days.

(21) Appl. No.: 15/227,581

(22) Filed: Aug. 3, 2016

(65) Prior Publication Data

US 2017/0067370 A1    Mar. 9, 2017

(30) Foreign Application Priority Data

Sep. 9, 2015  (KR) .................. 10-2015-0127573

(51) Int. Cl.
  *F01K 23/10*    (2006.01)
  *F02M 31/10*    (2006.01)
  (Continued)

(52) U.S. Cl.
  CPC .............. *F01K 23/10* (2013.01); *F01K 11/00* (2013.01); *F01P 3/20* (2013.01); *F01P 5/10* (2013.01); *F01P 7/14* (2013.01); *F02B 29/0443* (2013.01); *F02B 29/0462* (2013.01); *F02B 33/443* (2013.01); *F02M 26/22* (2016.02); *F02M 31/042* (2013.01); *F02M 31/10* (2013.01); *F02N 19/10* (2013.01); *Y02T 10/126* (2013.01); *Y02T 10/146* (2013.01); *Y02T 10/16* (2013.01); *Y02T 10/166* (2013.01)

(58) Field of Classification Search
  CPC ......... F01K 23/10; F01K 11/00; F02M 31/10; F02M 31/042; F02M 26/22; F02N 19/10; F01P 5/10; F01P 3/20; F01P 7/14; F02B 29/0443; F02B 29/0462; Y02T 10/146; Y02T 10/166; Y02T 10/126; Y02T 10/16
  USPC .................. 60/614, 616, 618, 653, 660–667
  See application file for complete search history.

(56) References Cited

U.S. PATENT DOCUMENTS

| 4,232,522 A | * | 11/1980 | Steiger .................. F01K 23/065 237/13 |
| 5,609,029 A | * | 3/1997 | Ahnger ................. F01K 23/065 60/618 |

(Continued)

FOREIGN PATENT DOCUMENTS

| EP | 2345796 A2 | 7/2011 |
| JP | 2013-238131 A | 11/2013 |

(Continued)

OTHER PUBLICATIONS

Korean Office Action dated Feb. 1, 2017, issued in Korean patent application No. 10-2015-0127573.

(Continued)

*Primary Examiner* — Hoang Nguyen
(74) *Attorney, Agent, or Firm* — McDermott Will & Emery LLP

(57) ABSTRACT

An engine preheating apparatus includes a waste heat recovery unit for recovering waste heat within a vehicle, and an air cooler connected to the waste heat recovery unit for receiving waste heat from the waste heat recovery unit, wherein an intake pipe in which intake air flows is connected to the air cooler in a communicating manner.

13 Claims, 3 Drawing Sheets

(51) Int. Cl.
*F02B 33/44* (2006.01)
*F01K 11/00* (2006.01)
*F01P 3/20* (2006.01)
*F01P 5/10* (2006.01)
*F01P 7/14* (2006.01)
*F02B 29/04* (2006.01)
*F02N 19/10* (2010.01)
*F02M 31/04* (2006.01)
*F02M 26/22* (2016.01)

(56) References Cited

U.S. PATENT DOCUMENTS

| | | | |
|---|---|---|---|
| 7,454,910 B2 | 11/2008 | Hamada et al. | |
| 7,956,230 B2* | 6/2011 | Timken | C07C 2/60 |
| | | | 208/262.1 |
| 7,997,076 B2* | 8/2011 | Ernst | F01K 9/04 |
| | | | 60/39.182 |
| 8,528,333 B2* | 9/2013 | Juchymenko | F01K 23/065 |
| | | | 60/618 |
| 8,590,494 B2 | 11/2013 | Kardos et al. | |
| 2009/0211253 A1* | 8/2009 | Radcliff | F01K 23/065 |
| | | | 60/670 |

FOREIGN PATENT DOCUMENTS

| | | |
|---|---|---|
| KR | 10-2002-0097208 A | 12/2002 |
| KR | 10-2011-0041393 A | 4/2011 |
| KR | 10-2015-0094775 A | 8/2015 |
| WO | 2014-096132 A1 | 6/2014 |

OTHER PUBLICATIONS

Korean Office Action dated Nov. 1, 2016, issued in Korean patent application No. 10-2015-0127573.

* cited by examiner

ENGINE PREHEATING APPARATUS AND PREHEATING METHOD OF THE ENGINE

CROSS-REFERENCE TO RELATED APPLICATION

This application claims the benefit of priority to Korean Patent Application No. 10-2015-0127573, filed on Sep. 9, 2015 with the Korean Intellectual Property Office, the disclosure of which is incorporated herein in its entirety by reference.

TECHNICAL FIELD

The present disclosure relates to an engine preheating apparatus and a preheating method of the engine capable of preheating intake air using waste heat within, or produced from, a vehicle when an engine is initially started, thus enhancing initial starting performance of the engine and fuel efficiency of the vehicle and increasing utilization of waste heat.

BACKGROUND

When a vehicle is initially started (a cold start), an engine and an intake system have low temperatures, and heat loss in the engine leads to lower fuel efficiency.

In order to improve this, an engine preheating apparatus in which an electrothermal air heater is installed to be adjacent to an inlet of an intake manifold to preheat intake air having a temperature equal to or lower than a predetermined temperature has been presented.

However, in the engine preheating apparatus using an electrothermal air heater as described above, an installation of the air heater requires an installation layout around an engine, degrading assembly characteristics, and in particular, requires a separate power source which may degrade overall fuel efficiency of a vehicle.

SUMMARY

The present disclosure has been made to solve the above-mentioned problems occurring in the prior art while advantages achieved by the prior art are maintained intact.

An aspect of the present disclosure provides an engine preheating apparatus and a preheating method thereof, capable of preheating intake air using waste heat within a vehicle when an engine is initially started, thus significantly enhancing initial start performance of the engine and fuel efficiency of the vehicle.

According to an exemplary embodiment of the present disclosure, an engine preheating apparatus includes: a waste heat recovery unit configured to recover waste heat within a vehicle; and an air cooler connected to the waste heat recovery unit and configured to receive waste heat from the waste heat recovery unit, wherein an intake pipe in which intake air flows is connected to the air cooler in a communicating manner.

The waste heat recovery unit may include a working fluid circulation path on which a working fluid circulates, and a working fluid circulation pump, one or more boilers, an expander, and a condenser may be installed on the working fluid circulation path.

A first bypass path may be installed to be adjacent to the expander, and a first bypass valve may be installed on the first bypass path.

An air preheating boiler/Charge Air Cooler (CAC) boiler may be installed on the working fluid circulation path of the waste heat recovery unit and disposed on an upstream side of the at least one boiler, and the intake pipe may be connected to the air preheating boiler and the air cooler in a communicating manner.

A coolant preheating boiler configured to preheat an engine coolant may be installed on the working fluid circulation path.

A water cooling type cooling circuit may be connected to the air cooler and may include a low temperature coolant circulation path on which a low temperature coolant circulates.

A low temperature radiator and a low temperature coolant circulation pump may be installed on the low temperature coolant circulation path, the low temperature radiator may be disposed on an upstream side of the air cooler, and the low temperature coolant circulation pump may be installed between the low temperature radiator and the air cooler.

A second bypass path may be installed to be adjacent to the low temperature radiator, and a second bypass valve may be installed on the second bypass path.

A low temperature heat exchanger may be installed on the low temperature coolant circulation path and disposed to be adjacent to the at least one boiler.

A gas pipe may be connected to the low temperature heat exchanger and the at least one boiler in a communicating manner.

According to another exemplary embodiment of the present disclosure, an engine preheating apparatus includes: a waste heat recovery unit having a Rankine cycle in which a boiler, an expander, a condenser, and a circulation pump are installed on a working fluid circulation path in which a working fluid circulates; a bypass path extending from an upstream side of the expander to a downstream side of the expander; a bypass valve installed on the bypass path and configured to selectively open and close the bypass path; an air preheating boiler installed on the circulation path; and an air cooler disposed to be adjacent to the air preheating boiler, wherein an intake pipe in which intake air passes is connected to the air preheating boiler and the air cooler in a communicating manner.

According to another exemplary embodiment of the present disclosure, an engine preheating method using an engine preheating apparatus having a waste heat recovery unit in which a working fluid circulation pump, a boiler, an expander, and a condenser are installed on a working fluid circulation path, a water cooling type cooling circuit in which a low temperature coolant circulation pump, a low temperature radiator, and an air cooler are installed on a low temperature coolant circulation path, a first bypass path installed to be adjacent to the expander, a first bypass valve installed on the first bypass path, a second bypass path installed to be adjacent to the low temperature radiator, and a second bypass valve installed on the second bypass path, includes: determining whether a condition in which an engine is required to be preheated is met; and opening the first bypass valve and the second bypass valve when the engine is required to be preheated.

When the engine is not required to be preheated, the first bypass valve and the second bypass valve may be closed.

After the first bypass valve and the second bypass valve are opened, when a temperature of intake air is lower than a lower limit reference value, the low temperature coolant circulation pump may be driven.

After the first bypass valve and the second bypass valve are opened, when a temperature of intake air is higher than a lower limit reference value, the working fluid circulation pump may be driven.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
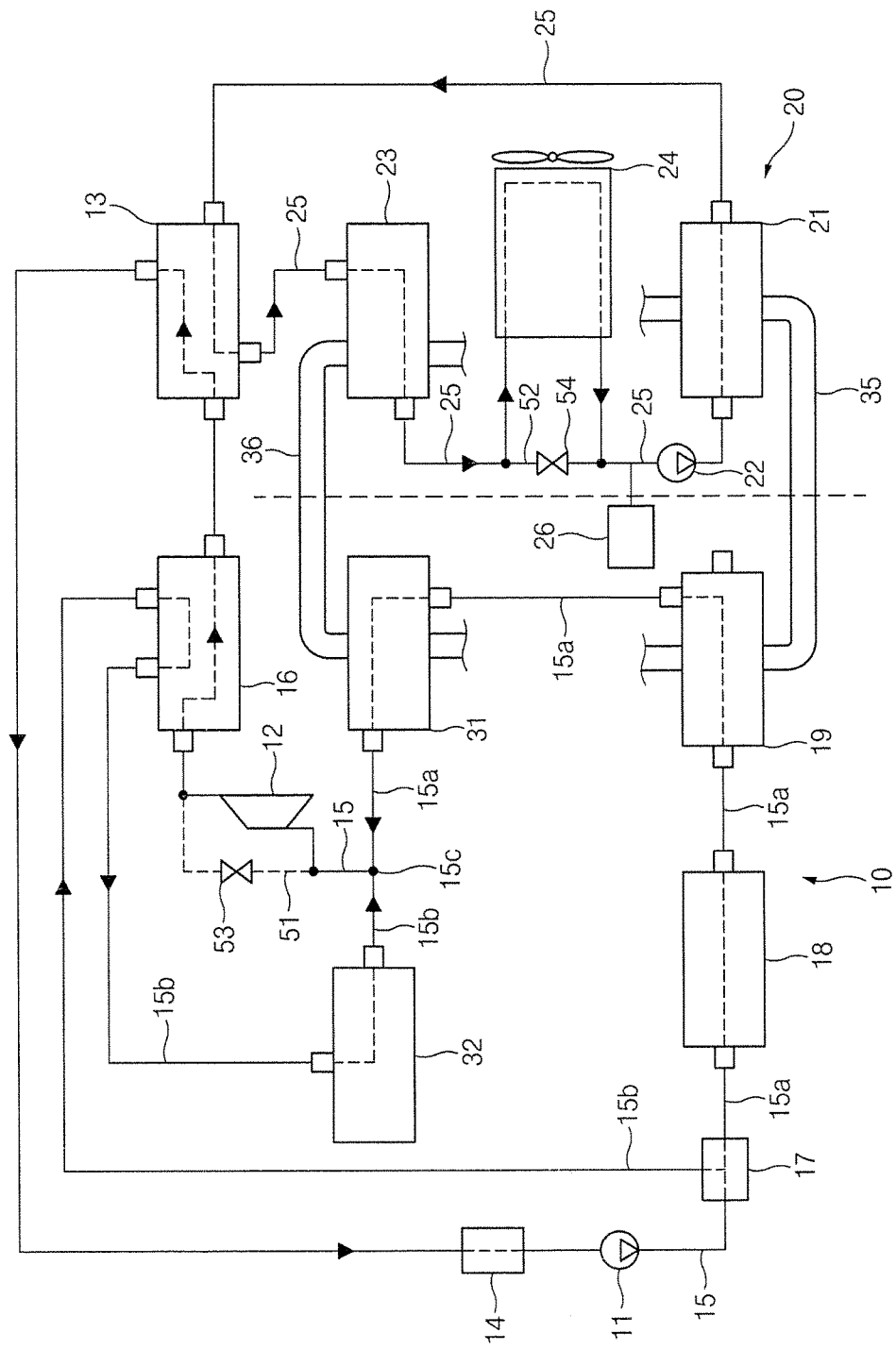
FIG. 1 is a view illustrating a configuration of an engine preheating apparatus according to an exemplary embodiment of the present disclosure.

Hereinafter, exemplary embodiments of the present disclosure will be described in detail with reference to the accompanying drawings. For reference, dimensions of elements or thicknesses of lines illustrated in the drawings referred to describe the present disclosure may be exaggerated to aid understanding. Also, the terms used henceforth have been defined in consideration of the functions of the present disclosure, and may be altered according to the intent of a user or operator, or conventional practice. Therefore, the terms should be defined on the basis of the entire content of this specification.

Referring to FIG. 1, an engine preheating apparatus according to an exemplary embodiment of the present disclosure may include a waste heat recovery unit 10 for recovering waste heat within a vehicle and an air cooler 21 installed to conduct heat-exchange with a portion of the waste heat recovery unit 10.

The waste heat recovery unit 10 may include a working fluid circulation path 15 in which a working fluid circulates, and a working fluid circulation pump 11, one or more boilers 31 and 32, an expander 12, and a condenser 13 may be installed on the working fluid circulation path 15 to configure a Rankine cycle.

The circulation pump 11 may be configured to circulate a working fluid on the working fluid circulation path 15.

The boilers 31 and 32 may be configured to heat and evaporate a working fluid by waste heat (heat of an exhaust gas and/or heat of an EGR gas) of an engine to generate a vaporized working fluid.

The expander 12 may be configured to expand the working fluid supplied from the boilers 31 and 32 to generate recovery power by waste heat.

The condenser 13 may be configured to condense the working fluid discharged from the expander 12 to generate a liquid working fluid.

A working fluid storage tank 14 in which a working fluid is stored may be disposed between the working fluid circulation pump 11 and the condenser 13. The working fluid storage tank 14 may be configured to temporarily store a working fluid having a liquid phase condensed by the condenser 13 or temporarily store a working fluid when the working fluid is collected as an operation of the waste heat recovery system is stopped (when the vehicle is stopped).

According to various exemplary embodiments, the boilers 31 and 32 may include an EGR boiler 31 and an exhaust boiler 32 connected in series or in parallel on the working fluid circulation path 15.

The EGR boiler 31 may be provided on an EGR path of the engine and configured to heat-exchange an EGR gas and the working fluid.

The exhaust boiler 32 may be provided in an exhaust pipe of the engine to conduct heat-exchange among an exhaust gas and the working fluid.

In FIG. 1, a configuration in which the EGR boiler 31 and the exhaust boiler 32 may be connected in parallel is illustrated. In detail, a first path 15a and a second path 15b may be disposed to be parallel in the middle of, or on, the working fluid circulation path 15 and branched from one side of a downstream of the circulation pump 11, a flow path switch valve 17 may be installed at a branch point of the first path 15a and the second path 15b, and a downstream end of the first path 15a and a downstream end of the second path 15b may join at a junction point 15c of the working fluid circulation path 15. The EGR boiler 31 may be installed on the first path 15a, and the exhaust boiler 32 may be installed on the second path 15b.

The expander 12 is disposed on a downstream side of the first and second boilers 31 and 32, and as a working fluid in a gas state discharged from the first boiler 31 and/or the second boiler 32 passes through the expander 12 under a normal temperature condition of the engine, the expander 12 may generate recovery power.

A first bypass path 51 may be installed to be adjacent to the expander 12. An inlet 51a of the first bypass path 51 may be connected to one side of an upstream of the expander 12 and an outlet 51b of the first bypass path 51 may be connected to one side of the downstream of the expander 12, whereby the first bypass path 51 may extend from the upstream side of the expander 12 to the downstream side of the expander 12.

A first bypass valve 53 may be installed in the inlet 51a or in the middle of, or on, the first bypass path 51, and the first bypass path 51 may be opened and closed by the first bypass valve 53. Thus, a working fluid may flow through the first bypass path 51 according to selective opening of the first bypass valve 53.

Based on the configuration of the first bypass path 51 and the first bypass valve 53, when the first bypass valve 53 is opened under a condition in which the engine is required to be preheated (for example, under a condition in which the engine is cold-started), the working fluid may bypass toward the first bypass path 51, and thus, the expander 12 may not operate and thus may not generate recovery power, and the working fluid may circulate the working fluid circulation path 15 to preheat the EGR boiler 31 and the exhaust boiler 32.

Also, a recuperator 16 may be installed between the expander 12 and the condenser 13, and a partial section of the working fluid circulation path 15 and a partial section of the second path 15b may penetrate through the recuperator 16. Thus, the working fluid flowing on the working fluid circulation path 15 and the working fluid flowing on the second path 15b may cross each other to flow so as to be heat-exchanged within the recuperator 16. For example, the working fluid discharged through an outlet of the expander 12 and the working fluid supplied toward the exhaust boiler 32 may be heat-exchanged within the recuperator 16, so that the working fluid supplied toward the exhaust boiler 32 may be preheated by the working fluid discharged from the expander 12.

An air preheating boiler 19 and a coolant preheating boiler 18 may be installed between the flow path switch valve 17 and the EGR boiler 31 on the first path 15a of the working fluid circulation path 15.

The air preheating boiler 19 may be disposed on the upstream side of the boilers 31 and 32, and the coolant preheating boiler 18 may be disposed on the upstream side of the air preheating boiler 19.

The air cooler 21 may be disposed to be adjacent to the air preheating boiler 19, and an intake pipe 35 in which intake air flows may be connected to the air cooler 21 and the air preheating boiler 19 in a communicating manner. Thus, under a condition in which the engine is required to be preheated (for example, under a cold-start condition of the engine), intake air having a low temperature may be heat-exchanged with the working fluid circulating through the first bypass path 51 in the air preheating boiler 19 so as to be preheated.

According to various exemplary embodiments of the present disclosure, the air cooler 21 may be configured as a water cooling type cooler or an air cooling type cooler.

According to an exemplary embodiment, a water cooling type cooling circuit 20 may be connected to the air cooler 21, and the water cooling type cooling circuit 20 may include a low temperature coolant circulation path 25 in which a low temperature coolant circulates.

A low temperature radiator 24 may be installed on the upstream side of the air cooler 21 on the low temperature coolant circulation path 25, and a low temperature coolant may be configured to be cooled as it passes through the low temperature radiator 24. The low temperature coolant cooled by the low temperature radiator 24 may be introduced to the air cooler 21 to cool air.

A low temperature coolant circulation pump 22 may be installed between the low temperature radiator 24 and the air cooler 21, and a coolant storage tank 26 may be installed on an upstream side of the low temperature coolant circulation pump 22.

A second bypass path 52 may be installed to be adjacent to the low temperature radiator 24. An inlet 52a of the second bypass path 52 may be connected to one side of an upper stream of the low temperature radiator 24, and an outlet 52b of the second bypass path 52 may be connected to one side of a lower stream of the low temperature radiator 24, whereby the second bypass path 52 may extend from the upstream side of the low temperature radiator 24 to the downstream side of the low temperature radiator 24.

A second bypass valve 54 may be installed at the inlet 52a or a middle portion of the second bypass path 52, and the second bypass path 52 may be opened and closed by the second bypass valve 54. Accordingly, a low temperature coolant may flow to the second bypass path 52 according to selective opening by the second bypass valve 54, and thus, cooling may not be performed by the low temperature radiator 24.

Through the configuration of the second bypass path 52 and the second bypass valve 54, the second bypass valve 54 may be opened under a condition in which the engine is required to be preheated, whereby the low temperature coolant may be bypassed toward the second bypass path 52, and thus, a low temperature coolant working fluid may be supplied to the air cooler 21 to preheat intake air.

Also, a low temperature heat exchanger 23 may be disposed on the upstream side of the low temperature radiator 24, and here, the low temperature heat exchanger 23 may be installed to be adjacent to the EGR boiler 31 or the exhaust boiler 32 of the waste heat recovery unit 10.

According to the exemplary embodiment of FIG. 1, a configuration in which the low temperature heat exchanger 23 may be installed to be adjacent to the EGR boiler 31 is illustrated.

A gas pipe 36 in which an EGR gas or an exhaust gas flows may be connected to the boilers 31 and 32 and the low temperature heat exchanger 23 in a communicating manner.

According to the exemplary embodiment of FIG. 1, the gas pipe 36 in which an EGR gas flows may be connected to the EGR boiler 31 and the low temperature heat exchanger 23 in a communicating manner. Thus, under a condition in which the engine is required to be preheated (for example, under a cold-start condition of the engine), a working fluid passing through the EGR boiler 31 may be preheated by the EGR gas, and a low temperature coolant passing through the low temperature heat exchanger 23 may be preheated by the EGR gas.

The low temperature coolant circulation path 25 may be installed such that a partial section thereof penetrates through the condenser 13 of the waste heat recovery unit 10. Accordingly, a low temperature coolant discharged from an outlet of the air cooler 21 may be heat-exchanged with the working fluid passing through the condenser 13, whereby the water cooling type cooling circuit 20 and the waste heat recovery unit 10 may be appropriately thermally balanced.

According to various exemplary embodiments of the present disclosure, the intake pipe 35 may be connected to the air preheating boiler 19 and the air cooler 20 in series in a communicating manner, and accordingly, under a condition in which the engine is required to be preheated, intake air may be preheated at two stages by the air preheating boiler 19 and the air cooler 20. In detail, as a working fluid passes through the first bypass path 51 and circulates on the working fluid circulation path 15, the working fluid, while passing through the air preheating boiler 19, preheats intake air having a low temperature for a first time, the first preheated intake air having a low temperature may be heat-exchanged with a low temperature coolant which has passed through the second bypass path 52 in the air cooler 21 so as to be preheated for a second time.

Also, according to various exemplary embodiments of the present disclosure, the gas pipe 36 may be connected to the EGR boiler 31 and the low temperature heat exchanger 23 in series in a communicating manner, and thus, an EGR gas may sequentially pass through the EGR boiler 31 and the low temperature heat exchanger 23 through the gas pipe 36. In detail, after the EGR gas, while passing through the EGR boiler 31, is heat-exchanged with the working fluid so as to be cooled for the first time, the cooled EGR gas, while passing through the low temperature heat exchanger 23, may be heat-exchanged with the low temperature coolant so as to be cooled for the second time, thus being cooled by two stages. Accordingly, the working fluid may be preheated by the EGR boiler 31 and the low temperature coolant may be preheated by the low temperature heat exchanger 23, whereby a preheating balance may be effectively implemented between the working fluid circulation path 15 and the low temperature coolant circulation path 25.

Figure 2:
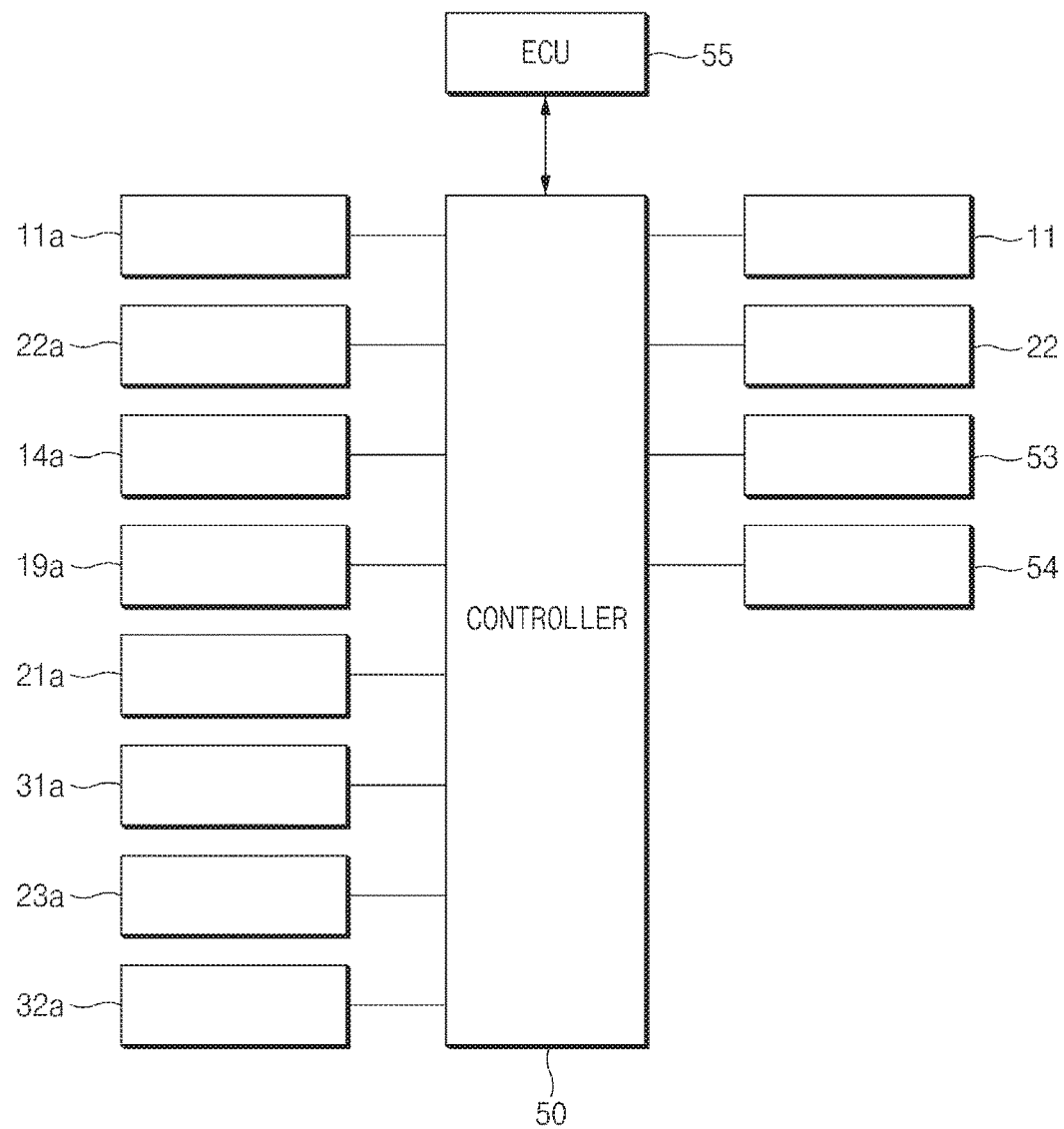
FIG. 2 is a view illustrating a configuration of connection relationships between a controller of an engine preheating apparatus according to an exemplary embodiment of the present disclosure and various sensors.

Also, referring to FIG. 2, various exemplary embodiments of the present disclosure may include a controller 50 for controlling operations of the working fluid circulation pump 11, the low temperature coolant circulation pump 22, the first bypass valve 53, and the second bypass valve 54.

The controller 50 may be connected to an ECU 55 of a vehicle and may receive various types of information such as a revolution per minute (RPM) of the engine, a temperature of a coolant of the engine, and a temperature of intake air from the ECU 55.

An RPM sensor 11a for a working fluid circulation pump for measuring an RPM of the working fluid circulation pump 11, an RPM sensor 22a for a low temperature coolant circulation pump for measuring an RPM of the low temperature coolant circulation pump 22, a temperature sensor 14a for measuring a temperature of a working fluid within the working fluid storage tank 14, a temperature sensor 19a for measuring a temperature of an inlet/outlet of the air preheating heat exchanger 19, a temperature sensor 21a for measuring a temperature of an inlet/outlet of the air cooler 21, a temperature sensor 31a for measuring a temperature of an inlet/outlet of the EGR boiler 31, a temperature 23a for measuring a temperature of an inlet/outlet of the low temperature heat exchanger 23, and a temperature sensor 32a for measuring a temperature of an inlet/outlet of the exhaust boiler 32 may be connected to the controller 50. Thus, the controller 50 may receive various types of information of the waste heat recovery unit 10 and the water cooling type cooling circuit 20.

In this manner, the controller 50 may accurately receive information of a vehicle, information of the waste heat recovery unit 10, and information of the water cooling type cooling circuit 20 and accurately control operations of the working fluid circulation pump 11, the low temperature coolant circulation pump 22, the first bypass valve 53, and the second bypass valve 54.

Figure 3:
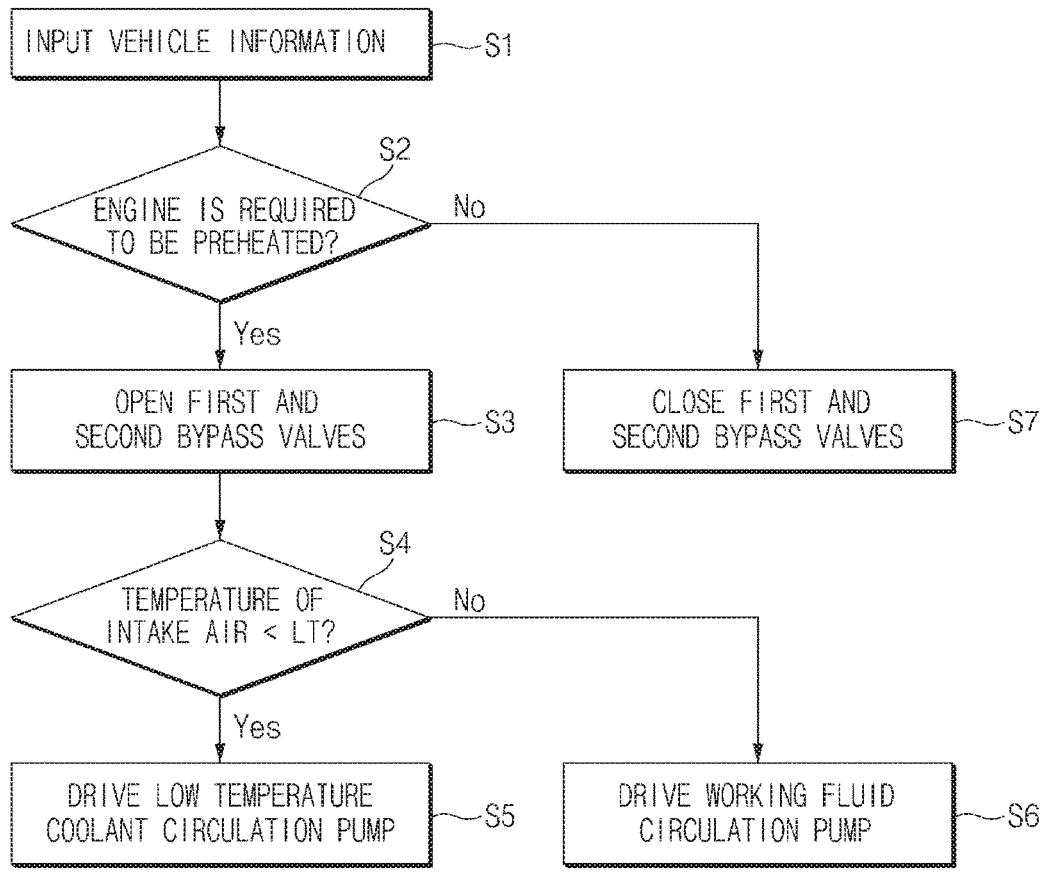
FIG. 3 is a flowchart illustrating an engine preheating method according to an exemplary embodiment of the present disclosure.

FIG. 3 is a flow chart illustrating an engine preheating method according to various exemplary embodiments of the present disclosure.

Various types of vehicle information, such as an RPM of an engine, a temperature of a coolant of the engine, and a temperature of intake air from the ECU 55 of the vehicle may be input to the controller 50 in operation S1.

Various types of information of the waste heat recovery unit 10 and the water cooling type cooling circuit 20, such as an RPM of the working fluid circulation pump 11, an RPM of the low temperature coolant circulation pump 22, a temperature of a working fluid, a temperature of the inlet/outlet of the air preheating heat exchanger 19, a temperature of the inlet/outlet of the air cooler 21, a temperature of the inlet/outlet of the EGR boiler 31, a temperature of the inlet/outlet of the low temperature heat exchanger 23, and a temperature of the inlet/outlet of the exhaust boiler 32 may be input to the controller 50.

After the information of the vehicle, the information of the waste heat recovery unit 10, and the information of the water cooling type cooling circuit 20 are input to the controller 50, the controller 50 may determine whether a condition in which the engine is required to be preheated is met in operation S2.

The condition in which the engine is required to be preheated will next be described in detail. That is, when a temperature of a coolant of the engine is lower than a preset value (for example, 80° C.), a temperature of intake air is lower than a preset value (for example, 50° C.), and a temperature of a working fluid stored in the working fluid storage tank 14 is lower than a preset value (for example, 50° C.), the controller 50 may determine that the condition in which the engine is required to be preheated is met, and may open the first and second bypass valves 53 and 54 in operation S3.

If, however, any one of the three conditions as described above is not met, the controller 50 may determine that the condition in which the engine is required to be preheated is not met, and may close the first and second bypass valves 53 and 54 in operation S7.

Meanwhile, in a state in which the first and second bypass valves 53 and 54 are open, when a temperature of intake air is lower than a lower limit reference value (LT, for example, 40° C.), the controller 50 may drive the low temperature coolant circulation pump 22 at a predetermined RPM (for example, 2000 RPM) in operation S5.

In detail, when the second bypass valve 54 is opened, a low temperature coolant may be introduced to the air cooler 21 through the second bypass path 52, and thus, the air cooler 21 may first preheat intake air by the low temperature coolant.

Here, the operation of the working fluid circulation pump 11 may be stopped, and thereafter, when temperatures of the boilers 31 and 32 are higher than a predetermined reference value (for example, 100° C.), the working fluid circulation pump 11 may be driven at a predetermined RPM (for example, 1000 RPM).

When the temperature of intake air is higher than the lower limit reference value LT, the controller 50 may drive the working fluid circulation pump 11 at a predetermined RPM (for example, 2000 RPM). A working fluid may circulate through the working fluid circulation path 15 and the first bypass path 51 according to driving of the working fluid circulation pump 11, and accordingly, the boilers 31 and 32 may be appropriately preheated by the working fluid which has bypassed the expander 12. The intake air, which has been first preheated by the air preheating boiler 19, may be secondly preheated by the air cooler 21, whereby the intake air may be effectively preheated.

Here, the controller 50 may drive the low temperature coolant circulation pump 22, while reducing an RPM thereof, in proportion to a temperature of the air preheating boiler 19.

As described above, according to exemplary embodiments of the present disclosure, initial starting performance of the engine and fuel efficiency of the vehicle may be significantly enhanced by preheating intake air using waste heat within the vehicle when the engine is initially started.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An engine preheating apparatus comprising:
   a waste heat recovery unit for recovering waste heat within a vehicle; and
   an air cooler connected to the waste heat recovery unit for receiving waste heat from the waste heat recovery unit,
   wherein an intake pipe in which intake air flows is connected to the air cooler in a communicating manner,
   wherein a water cooling type cooling circuit is connected to the air cooler and includes a low temperature coolant circulation path on which a low temperature coolant circulates, and
   wherein a low temperature radiator and a low temperature coolant circulation pump are installed on the low temperature coolant circulation path, the low temperature radiator being disposed on an upstream side of the air cooler, and the low temperature coolant circulation pump being installed between the low temperature radiator and the air cooler.

2. The engine preheating apparatus according to claim 1, wherein the waste heat recovery unit includes a working fluid circulation path on which a working fluid circulates, and wherein a working fluid circulation pump, one or more boilers, an expander, and a condenser are installed on the working fluid circulation path.

3. The engine preheating apparatus according to claim 2, wherein a first bypass path is installed to be adjacent to the expander, and a first bypass valve is installed on the first bypass path.

4. The engine preheating apparatus according to claim 2, wherein an air preheating boiler is installed on the working fluid circulation path of the waste heat recovery unit and disposed on an upstream side of the at least one boiler, and the intake pipe is connected to the air preheating boiler and the air cooler in a communicating manner.

5. The engine preheating apparatus according to claim 1, wherein a coolant preheating boiler for preheating an engine coolant is installed on a working fluid circulation path.

6. The engine preheating apparatus according to claim 1, wherein a second bypass path is installed to be adjacent to the low temperature radiator, and a second bypass valve is installed on the second bypass path.

7. The engine preheating apparatus according to claim 6, wherein a low temperature heat exchanger is installed on the low temperature coolant circulation path and disposed to be adjacent to the at least one boiler.

8. The engine preheating apparatus according to claim 7, wherein a gas pipe is connected to the low temperature heat exchanger and the at least one boiler in a communicating manner.

9. An engine preheating apparatus comprising:
a waste heat recovery unit having a Rankine cycle in which a boiler, an expander, a condenser, and a circulation pump are installed on a working fluid circulation path in which a working fluid circulates;
a bypass path extending from an upstream side of the expander to a downstream side of the expander;
a bypass valve installed on the bypass path for selectively opening and closing the bypass path;
an air preheating boiler installed on the working fluid circulation path; and
an air cooler disposed to be adjacent to the air preheating boiler,
wherein an intake pipe in which intake air passes is connected to the air preheating boiler and the air cooler in a communicating manner,
wherein a water cooling type cooling circuit is connected to the air cooler and includes a low temperature coolant circulation path on which a low temperature coolant circulates, and
wherein a low temperature radiator and a low temperature coolant circulation pump are installed on the low temperature coolant circulation path, the low temperature radiator being disposed on an upstream side of the air cooler, and the low temperature coolant circulation pump being installed between the low temperature radiator and the air cooler.

10. An engine preheating method using an engine preheating apparatus having a waste heat recovery unit in which a working fluid circulation pump, a boiler, an expander, and a condenser are installed on a working fluid circulation path, a water cooling type cooling circuit in which a low temperature coolant circulation pump, a low temperature radiator, and an air cooler are installed on a low temperature coolant circulation path, a first bypass path installed to be adjacent to the expander, a first bypass valve installed on the first bypass path, a second bypass path installed to be adjacent to the low temperature radiator, a second bypass valve installed on the second bypass path, and an air preheating boiler installed on the working fluid circulation path,
the engine preheating method comprising:
determining whether a condition in which an engine is required to be preheated is met; and
opening the first bypass valve and the second bypass valve when the engine is required to be preheated based on the determination step,
wherein a water cooling type cooling circuit is connected to the air cooler and includes a low temperature coolant circulation path on which a low temperature coolant circulates, and
wherein a low temperature radiator and a low temperature coolant circulation pump are installed on the low temperature coolant circulation path, the low temperature radiator being disposed on an upstream side of the air cooler, and the low temperature coolant circulation pump being installed between the low temperature radiator and the air cooler.

11. The engine preheating method according to claim 10, wherein when the engine is not required to be preheated, the first bypass valve and the second bypass valve are closed.

12. The engine preheating method according to claim 10, wherein after the first bypass valve and the second bypass valve are opened, when a temperature of intake air is lower than a lower limit reference value, the low temperature coolant circulation pump is driven.

13. The engine preheating method according to claim 10, wherein after the first bypass valve and the second bypass valve are opened, when a temperature of intake air is higher than a lower limit reference value, the working fluid circulation pump is driven.

* * * * *